UNITED STATES PATENT OFFICE 2,630,431

METALLIZED DISAZO DYES

Joseph H. Trepagnier, Wilmington, Del., assignor to E. I. du Pont de Nemours and Company, Wilmington, Del., a corporation of Delaware No Drawing. Application February 24, 1951, Serial No. 212,669)

8 Claims. (Cl. 260—148)

This invention relates to dyes which are useful in coloring cotton and regenerated cellulose, and more particularly to a new class of light-fast, water-soluble, blue-gray azo dyes.

Many of the gray dyes which are now known and which may be used in the coloring of cotton and regenerated cellulose are deficient in fastness properties, especially in fastness to light. Lack of light fastness is of importance when the dyes are used to color wearing apparel, automobile upholstery, draperies and the like. Furthermore, in recent years many cotton and rayon fabrics are after-treated with creaseproofing agents such as melamine-formaldehyde and urea-formaldehyde resins. Such creaseproofing agents frequently affect the shade and light fastness of the dyes with which the fabrics have been colored.

It is an object of this invention to provide a new class of gray azo dyes which are water soluble and light fast and which may be used in the dyeing of cotton and other cellulosic materials. It is a further object to provide dyestuffs of this type which are unaffected by the ordinary creaseproofing agents.

These objects are accomplished by a new class of gray metallized disazo dyes having the formula:

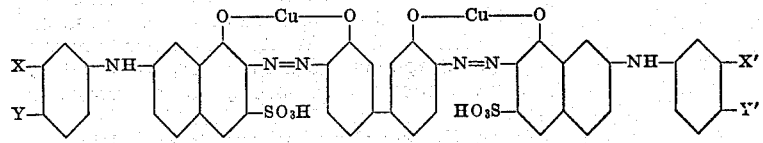

in which at least one of X, Y, X' and Y' is a sulfonic acid radical, no more than one sulfonic acid radical being attached to the same aromatic nucleus, and in which the others of X, Y, X' and Y' are members of the class consisting of hydrogen and methyl, no more than one methyl group being attached to the same aromatic nucleus.

These dyes are made by coupling tetrazotized dianisidine with gamma acid, i. e., 7-amino-1-naphthol-3-sulfonic acid, in which the amino group carries the appropriate aromatic substituent, and thereafter coppering the coupled dye.

One useful group of dyes falling within the general formula are the tetrasulfo disazo dyes made by coupling tetrazotized dianisidine with two moles of N-sulfophenyl gamma acid or N-sulfotolyl gamma acid in which the sulfo and methyl groups are in the meta or para positions, and thereafter coppering. The formula of these compounds is:

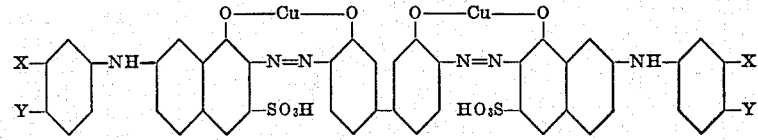

in which one of X and Y is a sulfonic acid radical and the other is a member of the class consisting of hydrogen and methyl.

Examples of such compounds are those in which the tetrazotized dianisidine is coupled, prior to coppering, with two moles of N-p-sulfophenyl gamma acid, with N-m-sulfophenyl gamma acid or with N-(m-sulfo-p-tolyl) gamma acid.

Another useful group of dyes contemplated by this invention are the trisulfo disazo dyes made by coupling tetrazotized dianisidine first with one mole of N-phenyl gamma acid and then with one mole of N-sulfophenyl or N-sulfotolyl gamma acid in which the sulfo and methyl groups are in the meta and para positions and thereafter coppering. The formula of these compounds is represented as follows:

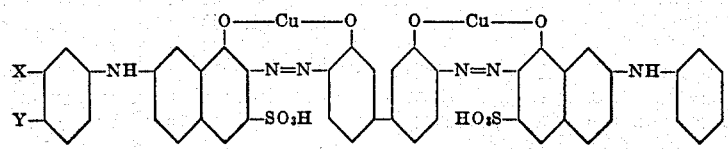

in which one of X and Y is a sulfonic acid radical and the other is a member of the class consisting of hydrogen and methyl.

The N-sulfophenyl and N-sulfotolyl gamma acids which are used in the preparation of the final dyes may be prepared by the reaction between gamma acid and sulfanilic acid, metanilic acid or aminotoluenesulfonic acid, in the presence of sulfur dioxide. The manner in which these substituted gamma acids may be prepared is shown in the following examples, in which the quantities of material are stated in parts by weight.

Example 1

64 parts of gamma acid (7-amino-1-naphthol-3-sulfonic acid) in the form of an aqueous paste are added in portions, with stirring, to enough water to make a total of 267 parts of water including that present in the gamma acid paste. 48.5 parts of sulfanilic acid are added to the mixture. This slurry is made permanently alkaline, as tested on Brilliant Yellow test paper, by the addition of 30% sodium hydroxide solution. On becoming alkaline, the slurry changes to a solution. The alkaline solution is run into an autoclave. The autoclave is sealed and flushed three times with sulfur dioxide. Sulfur dioxide is then added to the charge until 35.3 parts have been absorbed. The charge is heated to 140 ± 5° C. during a period of three to four hours and is held at this temperature for 12–15 hours. The charge is then cooled to 90–95° C., any remaining pressure is vented and hydrated lime is added to the mixture until the pH is 11–11.5. This mixture is held at 90–95° C. for 8 hours and is then filtered while hot to remove calcium sulfite. The filtrate, which contains the desired product, is adjusted to pH 5 to 7 by the addition of 78% sulfuric acid. The solution is clarified by stirring with 13.4 parts of activated carbon and filtering. This solution, containing about 15% of N-p-sulfophenyl gamma acid, is retained for use in preparing one of the dyes of the invention. This compound has the formula:

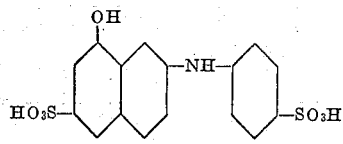

If an equal amount of metanilic acid (m-aminobenzenesulfonic acid) is substituted for the sulfanilic acid employed in this example, N-(m-sulfophenyl) gamma acid is obtained, having the formula:

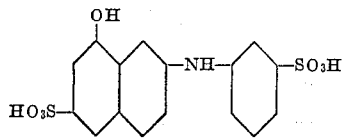

Example 2

360 parts of gamma acid as an aqueous paste and 290 parts of 5-amino-o-toluenesulfonic acid are mixed in 1500 parts of water, including the quantity of water in the gamma acid paste. A sufficient amount of 30% solution of sodium hydroxide is added to this slurry to make it slightly alkaline (as shown by a test on Brilliant Yellow paper). A clear solution of the two sulfonic acids results. This solution is placed in an autoclave and the autoclave is sealed. Sulfur dioxide is introduced at 25–30° C. by alternately increasing the pressure to 40–50 pounds per square inch and letting it drop off to 20–30 pounds. This operation is continued until 195 grams of sulfur dioxide are absorbed. The charge is heated to 135–145° C., while venting any pressure over 50–55 pounds, and held at this temperature for 17 hours. The charge is cooled to 90–95° C. and the pressure is released. Hydrated lime is added in small portions until the mixture gives an alkaline test on phenolphthalein paper. The mixture is agitated at 90–100° for 4 hours to release ammonia. It is then filtered and the cake of calcium sulfite is washed with water. The filtrate and washings are combined and are reheated to 90–95° C. and adjusted to pH 5–7 by the addition of 30% sulfuric acid. After the addition of 76 parts of the charcoal the solution is filtered and cooled to 20–25° C. For each 100 parts of solution 15 parts of salt are added with agitation. The light tan colored precipitate is filtered off and dried. The product is 7(4-methyl-3-sulfoanilino)-1-napthol-3-sulfonic acid, or N-(m-sulfo-p-tolyl) gamma acid, and has the formula:

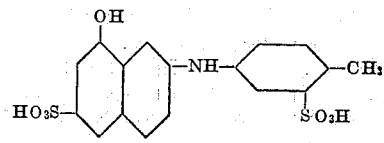

In the following examples, these substituted gamma acids are used to prepare the azo dyes of this invention. In each case, quantities are given as parts by weight.

Example 3

244 parts of dianisidine in 3000 parts of water are acidified with 97 parts of hydrochloric acid and 154 parts of sulfuric acid. The resulting solution is cooled to 20° C. by the addition of 2000 parts of ice and is then tetrazotized at 20–25° C. with 138 parts of sodium nitrite, with a ten-minute end point on starch-iodide test paper. The resulting solution of tetrazotized dianisidine is clarified by means of activated carbon and the excess nitrite present in the solution is neutralized by the addition of sulfamic acid.

950 parts of N-p-sulfophenyl gamma acid, prepared as a solution according to the method of Example 1, are diluted with water to a volume of 10,000 parts by weight. The resulting solution is made slightly alkaline to Brilliant Yellow test paper by adding a small amount of sodium hydroxide. 424 parts of sodium carbonate are added and dissolved and the solution is cooled to 10° C. by adding about 1,000 parts of ice. The dianisidine tetrazo solution is then run into the alkaline N-p-sulfophenyl gamma acid solution with rapid agitation. An excess of the sodium salt of N-p-sulfophenyl gamma acid and a pH of 8 to 9 are maintained throughout the coupling process.

When the coupling reaction is complete, the resulting blue-black slurry is heated to 70° C. and 4,000 parts of common salt are added. The charge is filtered and the filter cake is washed with 20% salt solution to remove the excess of the sodium salt of N-p-sulfophenyl gamma acid.

The filter cake from the coupling reaction is then dissolved in 15,000 parts of water at 50–60° C. and 2,500 parts of salt and 170 parts of ammonia (in aqueous solution) are added. 500 parts of copper sulfate crystals dissolved in 2,000 parts of water are added and the charge is heated to 95° C. and maintained at 92±2° C. for six hours. Phenolphthalein alkalinity and an excess of copper are maintained throughout the coppering process. The coppered product is obtained as a dark slurry which is filtered and washed with 10% salt solution. The filter cake is air-dried at 80° C. 1,500 parts of dry product are obtained, having the formula:

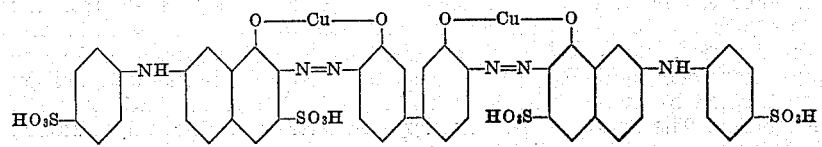

If an equal amount of N-m-sulfophenyl gamma acid is substituted for the N-p-sulfophenyl gamma acid in the coupling reaction, a dye is obtained which has very similar properties. Its formula is:

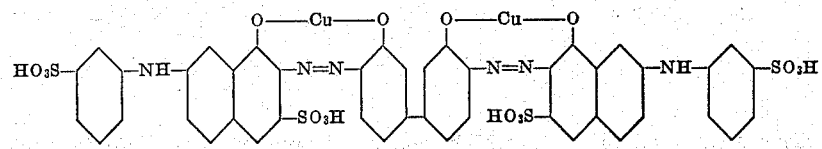

*Example 4*

An equivalent amount of N-(m-sulfo-p-tolyl) gamma acid is used in place of the N-p-sulfophenyl gamma acid used in Example 3, and a dye is obtained which has similar dyeing and fastness properties. The formula of this dye is:

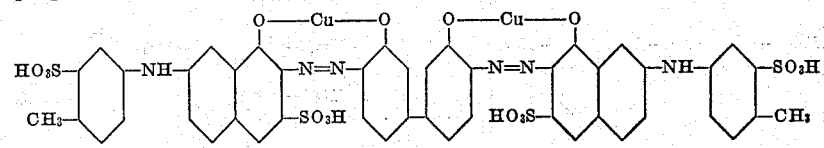

*Example 5*

244 parts of dianisidine are tetrazotized as in Example 3. Sodium carbonate is added to it until the pH is 4.0 to 4.5.

A solution of 315 parts of N-phenyl gamma acid and 40 parts of sodium hydroxide in 4000 parts of water is added to the tetrazo solution together with enough sodium carbonate to keep the pH at 7.0 to 7.5. This amount of N-phenyl gamma acid is sufficient to form a monoazo coupling with dianisidine. There is then added a solution of 475 parts of N-m-sulfophenyl gamma acid, prepared as in Example 1, together with enough sodium carbonate to bring the pH up to 8.0 to 8.5.

The disazo product is salted out, filtered and converted to the copper compound just as in Example 3.

The dye obtained in this example is similar to those obtained in Example 3, but the dyeing is a redder shade of blue gray. This dye has the formula:

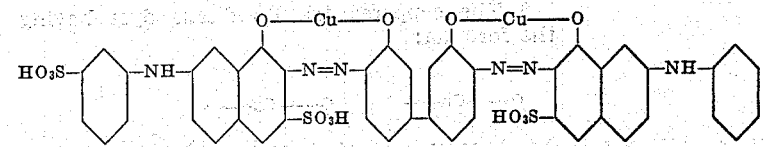

*Example 6*

The procedure outlined in Example 5 is repeated using N-(m-sulfo-p-tolyl) gamma acid in place of N-m-sulfophenyl gamma acid. The resulting gray dye is similar in shade and in dyeing and fastness properties to that prepared according to the procedure of Example 5. Its formula is:

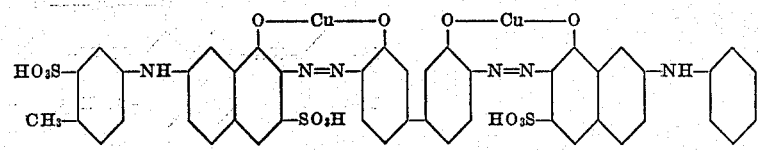

In the same manner, other dyes may be prepared by coupling tetrazotized dianisidine with two moles of N-(p-sulfo-m-tolyl) gamma acid; with one mole of N-phenyl gamma acid and one mole of N-p-sulfophenyl gamma acid or N-(p-sulfo-m-tolyl) gamma acid; with one mole of N-m-tolyl or N-p-tolyl gamma acid and one mole of N-p-sulfophenyl, N-m-sulfophenyl, N-(p-sulfo-m-tolyl) or N-(m-sulfo-p-tolyl) gamma acid; or with one mole of N-p-sulfophenyl, N-m-sulfophenyl, N-(p-sulfo-m-tolyl) or N-(m-sulfo-p-toyl) gamma acid and with one mole of a different N-sulfophenyl or N-sulfotolyl gamma acid from this same group of compounds. In each case the coupled dyestuff is coppered to form the final product. All of these compounds are gray, light-fast dyes.

The most convenient method of coppering the coupled dye-stuff is usually to employ an excess of copper sulfate in a solution made alkaline with ammonia. It is also possible to use other copper compounds, such as copper acetate, in place of copper sulfate and to use organic amines in place of ammonia. Suitable amines are pyridine, the picolines, ethanolamine, diethanolamine, triethanolamine, methylglucamine, tri(hydroxymethyl) aminomethane, 1,3-diaminopropanol-2, morpholine and the like.

The same final coppered dyes are obtainable if 3,3'-dihydroxybenzidine is used in place of dianisidine, but the coupling reaction proceeds less smoothly and easily than when dianisidine is used and poorer yield and purity are obtained.

It is therefore desirable to start the synthesis with dianisidine.

The dyes of this invention color cotton and regenerated cellulosic materials pleasing blue-gray shades of excellent light fastness. They have the unexpected advantage that their light and fastness properties are unaffected by subsequent creaseproofing of the fabrics. The dyes have good wash fastness, discharge and resistance to perspiration. A further advantage of these dyes is that when some fading by light does occur, the dyes fade on tone, i. e., the faded portions become weaker but retain the same shade as the completely unfaded dye. This property makes the dyes valuable as components of mixtures of dyes in the preparation of tan, taupe, brown and other shades containing some gray.

I claim:
1. The coppered disazo dyes having the formula:

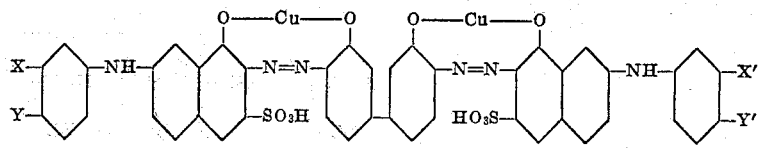

in which at least one of X, Y, X' and Y' is a sulfonic acid radical, no more than one sulfonic acid radical being attached to the same aromatic nucleus, and in which the others of X, Y, X' and Y' are members of the class consisting of hydrogen and methyl, no more than one methyl group being attached to the same aromatic nucleus.

2. The coppered tertrasulfo disazo dyes having the formula:

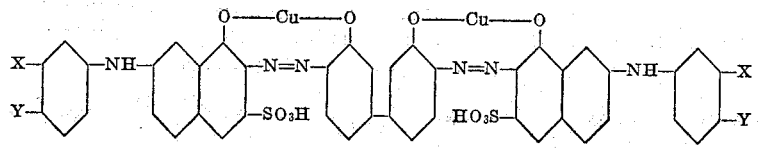

in which one of X and Y is a sulfonic acid radical and the other is a member of the class consisting of hydrogen and methyl.

3. The coppered tetrasulfo disazo dye having the formula:

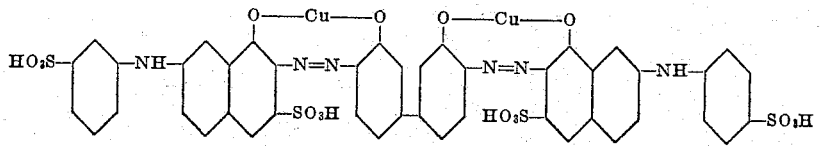

4. The coppered tetrasulfo disazo dye having the formula:

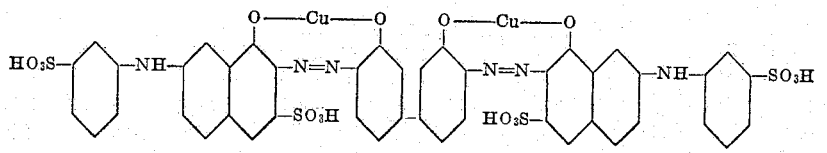

5. The coppered tetrasulfo disazo dye having the formula:

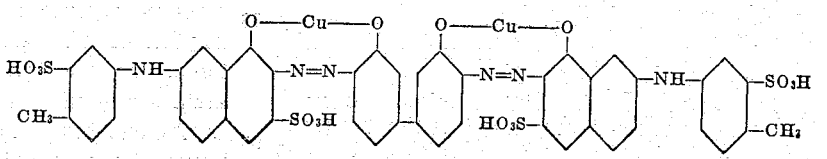

6. The coppered trisulfo disazo dyes having the formula:

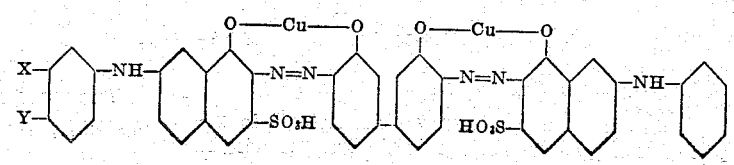

in which one of X and Y is a sulfonic acid radical and the other is a member of the class consisting of hydrogen and methyl.

7. The coppered trisulfo disazo dye having the formula:

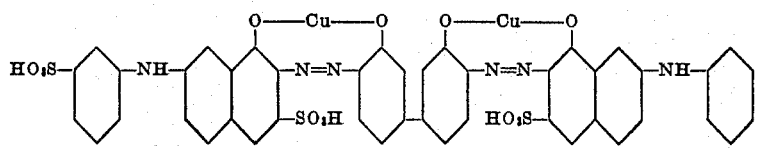

8. The coppered trisulfo disazo dye having the formula:

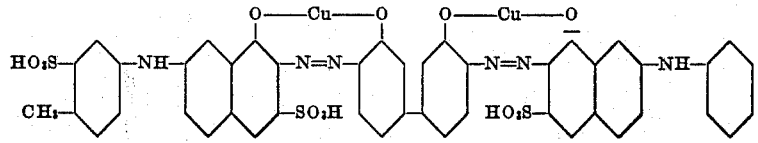

JOSEPH H. TREPAGNIER.

REFERENCES CITED

The following references are of record in the file of this patent:

UNITED STATES PATENTS

| Number | Name | Date |
|---|---|---|
| 1,889,732 | Stusser et al. | Nov. 29, 1932 |
| 2,370,500 | Sparks | Feb. 27, 1945 |
| 2,426,977 | Straub et al. | Sept. 9, 1947 |
| 2,437,699 | Laucius et al. | Mar. 16, 1948 |